United States Patent [19]

Oka et al.

[11] Patent Number: 5,672,658

[45] Date of Patent: Sep. 30, 1997

[54] HIGHLY STIFF PROPYLENE-ETHYLENE BLOCK COPOLYMER COMPOSITION AND A PROCESS FOR PRODUCING THE SAME

[75] Inventors: Takahiro Oka; Shunji Kawazoe; Yasuhiro Yamane, all of Chibaken, Japan

[73] Assignee: Chisso Corporation, Osaka, Japan

[21] Appl. No.: 516,089

[22] Filed: Aug. 17, 1995

[30] Foreign Application Priority Data

Aug. 18, 1994 [JP] Japan ................................ 6-217865
Mar. 31, 1995 [JP] Japan ................................ 7-100106

[51] Int. Cl.$^6$ .................................................. C08F 297/08
[52] U.S. Cl. ........................... 525/53; 525/247; 525/270; 525/323
[58] Field of Search ........................... 525/53, 247, 270, 525/323

[56] References Cited

U.S. PATENT DOCUMENTS

| | | | |
|---|---|---|---|
| 4,771,103 | 9/1988 | Chiba et al. | 525/53 |
| 5,055,528 | 10/1991 | Kioka et al. | 525/270 |

FOREIGN PATENT DOCUMENTS

| | | |
|---|---|---|
| 47-8207 | 3/1972 | Japan . |
| 49-13231 | 3/1974 | Japan . |
| 49-13514 | 4/1974 | Japan . |
| 50-108385 | 8/1975 | Japan . |
| 50-115296 | 9/1975 | Japan . |
| 50-126950 | 10/1975 | Japan . |
| 51-20297 | 2/1976 | Japan . |
| 51-28189 | 3/1976 | Japan . |
| 51-64586 | 6/1976 | Japan . |
| 51-92885 | 8/1976 | Japan . |
| 51-136625 | 11/1976 | Japan . |
| 52-4588 | 1/1977 | Japan . |
| 52-87489 | 7/1977 | Japan . |
| 52-100596 | 8/1977 | Japan . |
| 52-104593 | 9/1977 | Japan . |
| 52-147688 | 12/1977 | Japan . |
| 53-2580 | 1/1978 | Japan . |
| 53-29390 | 3/1978 | Japan . |
| 53-35879 | 4/1978 | Japan . |
| 53-40093 | 4/1978 | Japan . |
| 53-40094 | 4/1978 | Japan . |
| 54-152095 | 11/1979 | Japan . |
| 55-764 | 1/1980 | Japan . |
| 55-8011 | 3/1980 | Japan . |
| 55-135102 | 10/1980 | Japan . |
| 55-135103 | 10/1980 | Japan . |
| 55-152710 | 11/1980 | Japan . |
| 56-881 | 1/1981 | Japan . |
| 56-11908 | 2/1981 | Japan . |
| 56-18606 | 2/1981 | Japan . |
| 58-83006 | 5/1983 | Japan . |
| 58-138705 | 8/1983 | Japan . |
| 58-138706 | 8/1983 | Japan . |
| 58-138707 | 8/1983 | Japan . |
| 58-138708 | 8/1983 | Japan . |
| 58-138709 | 8/1983 | Japan . |
| 58-138710 | 8/1983 | Japan . |
| 58-138715 | 8/1983 | Japan . |
| 58-201816 | 11/1983 | Japan . |
| 60-23404 | 2/1985 | Japan . |
| 61-21109 | 1/1986 | Japan . |
| 61-37802 | 2/1986 | Japan . |
| 61-37803 | 2/1986 | Japan . |
| 62-104810 | 5/1987 | Japan . |
| 62-104811 | 5/1987 | Japan . |
| 62-104812 | 5/1987 | Japan . |
| 62-104813 | 5/1987 | Japan . |
| 63-54405 | 3/1988 | Japan . |

OTHER PUBLICATIONS

Hawley's Condensed Chemical Dictionary, Eleventh Edition, Van Nostrand Reinhold, New York, p. 1213. 1986.

*Primary Examiner*—Romulo H. Delmendo
*Attorney, Agent, or Firm*—Lowe, Price, LeBlanc & Becker

[57] ABSTRACT

A propylene.ethylene block copolymer composition having a high stiffness and high-impact properties and its production process are provided, which composition is produced by using a specified Ziegler-Natta type catalyst;

carrying out polymerization step (I) wherein homopolymerization of propylene is carried out by means of two or more polymerization vessels so as to afford 60 to 95% by weight based upon the total weight, and a specified range of the maximum value and the minimum value of the melt flow rates of the polymers obtained in the respective vessels; and carrying out polymerization step (II) wherein propylene-ethylene random copolymerization is carried out by means of one or more polymerization vessels so as to afford 5 to 40% by weight based upon the total quantity, the ratio of the melt flow rate at the polymerization step (I) to the melt flow rate at the polymerization step (II) being made to fall within a specified range, whereby the resulting ethylene.propylene block copolymer composition is far superior in the collective strength to known ethylene.propylene block copolymer compositions.

1 Claim, 1 Drawing Sheet

FIG. 1

HIGHLY STIFF PROPYLENE-ETHYLENE BLOCK COPOLYMER COMPOSITION AND A PROCESS FOR PRODUCING THE SAME

BACKGROUND OF THE INVENTION

1. Field of the Invention

This invention relates to a highly stiff, molding propylene.ethylene block copolymer composition and a process for producing the same. More particularly, the present invention relates to the above polymer composition affording a molded product having high stiffness and high-impact properties even when no particular additive is added, and a process for producing the same.

2. Description of Related Art

Crystalline polypropylene (often referred merely to polypropylene) as a multi-purpose resin is provided with a high stiffness, hardness, tensile strength, heat-resistance, etc. However, it has insufficient high-impact properties; hence there is a problem that it is difficultly used for a molded product subjected to mechanical impact or used at low temperatures. Further, when it is compared with other multi-purpose resins such as ABS resin or high-impact polystyrene resins, it is inferior not only in high-impact properties but also in stiffness. Thus, in order to enlarge concrete use applications of polypropylene and hence its demand, it is desired to improve not only the above impact properties but also its stiffness furthermore.

Crystalline polypropylene produced using a stereo-regular catalyst is provided with superior properties such as stiffness, heat-resistance, etc., but on the other hand, there is a problem that its high-impact strength, particularly high-impact properties at low temperature are low; hence, practically, its utilization range has been restricted. Thus, as a process for solving the problem, a process of random- or block-copolymerizing propylene with other α-olefin such as ethylene, has been known.

The resulting random copolymer is insufficient particularly in the improvement of low-temperature high-impact properties as compared with that of polypropylene, and the stiffness, strength, heat resistance, etc. rapidly decrease with increase of ethylene content. Similarly, the block copolymer is notably improved in low-temperature high-impact properties, but to the contrary, its stiffness, hardness, heat-resistance, etc. decrease, as compared with polypropylene. Thus, a number of processes for improving the drawbacks of the block copolymer have been proposed.

For example, Japanese patent application laid-open Nos. Sho 50-115296, Sho 52-4588 and Sho 53-35879, disclose a process of carrying out the block copolymerization of propylene with ethylene according to multistage process. Further, for example, Japanese patent publication Nos. Sho 47-8207, Sho 49-13231 and Sho 49-13514 disclose an improved process of adding a third component to the catalyst. Further, Japanese patent application laid-open Nos. Sho 55-764, Sho 54-152095, Sho 53-29390 and publication No. Sho 55-8011, disclose an improved process of using a specified catalyst.

However, these various proposals are directed to a technique of making the reduction extent of the stiffness of the resulting bock copolymer as small as possible, as compared with polypropylene (homopolymer); hence a stiffness value similar to that of the homopolymer or larger than that has not yet been effected. Further, Japanese patent application laid-open No. Sho 58-201816 discloses a process for producing a highly stiff propylene.ethylene block copolymer having a stiffness similar to that of polypropylene or higher than that, but the improvement in the high-impact properties has been insufficient.

Thus, in view of the present status of the above known prior art, the present inventors have made extensive research in inventing a production process of a propylene.ethylene block copolymer having a high stiffness and high-impact properties, without adding any particular additive, and as a result, have found that the aimed copolymer can be obtained under the specified conditions described below, and have achieved the present invention. As apparent from the foregoing, the object of the present invention is to provide a propylene.ethylene block copolymer composition suitable to a molded product having a high stiffness and high-impact properties, and a process for producing the same.

SUMMARY OF THE INVENTION

The present invention has the following constitutions:

(1) In a process for producing a propylene.ethylene block copolymer characterized in that there is used a catalyst system having combined (A) a solid catalyst component containing Ti, Mg, halogen and a polyvalent carboxylic acid ester as indispensable components, (B) an organoaluminum compound and (C) an organosilicon compound expressed by the formula $R^4{}_xR^5{}_ySi(OR^6)_z$ wherein $R^4$ and $R^6$ each represent a hydrocarbon radical, $R^5$ represents a hydrocarbon radical or a hydrocarbon radical containing a hetero atom, and $X+Y+Z=4$, $0 \leq X \leq 2$, $1 \leq Y \leq 3$, $1 Z \leq 3$, and the following two polymerization steps are carried out:

a first polymerization step (I) directed mainly to propylene polymerization, wherein monomers in a ratio of ethylene/(ethylene+propylene)=0 to 5% by weight are fed in two or more polymerization vessels connected in series, to produce 60 to 95% of the total polymerized quantity, and a second polymerization step (II) containing a relatively large quantity of ethylene, wherein monomers in a ratio of ethylene/(ethylene/(ethylene+propylene))=10 to 100% by weight are fed in one or more polymerization to produce 5 to 40% by weight of the total polymerized quantity, a process for producing a highly stiff propylene.ethylene block copolymer composition characterized in that the composition is produced so that the maximum value of the melt flow rates (hereinafter referred to as MFR(h)) of the polymers obtained in the respective vessels of the polymerization step (I) and the minimum value thereof (hereinafter referred to as MFR (1)), can have a relationship of $$0.1 \leq Log(MFR(h)/MFR(1)) \leq 1$$

and the MFR(i) of the polymers obtained at the polymerization step (I), directed mainly to propylene and the MFR(ii) of the polymers obtained at the polymerization step (II) containing a relatively large quantity of ethylene can have a relationship of $$3 \leq Log(MFR(i)/MFR(ii)) \leq 7$$

(2) A process for producing a highly stiff propylene.ethylene block copolymer composition according to item (1), wherein the molar ratio of the organosilicon compound (C) to the organoaluminum compound (B) is $$(B)/(C)=1 \text{ to } 15.$$

(3) In a propylene.ethylene block copolymer composition produced by using a catalyst system having combined (A) a solid catalyst component containing Ti, Mg, halogen and a polyvalent carboxylic acid ester as indispensable components, (B) an organoaluminum compound and (C) an organosilicon compound expressed by the formula $R^4{}_x R^5{}_y Si(OR^6)_z$ wherein $R^4$ and $R^6$ each represent a hydrocarbon radical, $R^5$ represents a hydrocarbon radical or a hydrocarbon radical containing a hetero atom, (x+y+z=4, $0 \leq x \leq 2$, $1 \leq y \leq 3$ and $1 \leq z \leq 3$) and carrying out the following two polymerization steps:

a first polymerization step (I) of carrying out propylene homopolymerization in two or more polymerization vessels connected in series to obtain 60 to 95% by weight of the total weight, and a second polymerization step (II) of copolymerizing propylene with ethylene in one or more polymerization vessels to produce a propylene.ethylene copolymerized portion of 5 to 40% by weight of the total weight, wherein the ethylene content is 30 to 80% by weight, a highly stiff propylene.ethylene block copolymer composition, wherein the maximum value (hereinafter referred to as MFR (h)) of melt flow rates of the polymers obtained in the respective vessels of the polymerization step (I) and the minimum value thereof (hereinafter referred to as MFR (h)) have a relationship of $$0.1 \leq \text{Log}(\text{MFR}(h)/\text{MFR}(l)) \leq 1 \quad (1);$$

the isotactic pentad ratio (P) of the propylene polymer obtained in the polymerization step (I) is 0.96 or more; Mw/Mn (Q value) is 6 or less; and the melt flow rate (hereinafter referred to as MFR (i)) of the polymer obtained at the polymerization step (I) and the melt flow rate (hereinafter referred to as MFR (ii)) of the polymer obtained at the polymerization step (II) have a relationship of $$3 \leq \text{Log}(\text{MFR}(i)/\text{MFR}(ii)) \leq 7 \quad (2).$$

(4) A highly stiff propylene.ethylene block copolymer composition according to item (3), wherein the MFR of the finally obtained polymer is 0.1 to 100.

(5) A highly stiff propylene.ethylene block copolymer composition according item (3) wherein the composition is obtained by polymerization in a hydrocarbon solvent.

(6) A highly stiff propylene.ethylene block copolymer composition according to item (3), wherein the MFR (h) and MFR (l) recited in item (3) have a relationship of $$0.2 \leq \text{Log}(\text{MFR}(h)/\text{MFR}(l)) \leq 0.5.$$

(7) A highly stiff propylene.ethylene block copolymer composition according to item (3), wherein the MFR (i) and MFR (ii) recited in item (3) have a relationship of $$4 \leq \text{Log}(\text{MFR}(i)/\text{MFR}(ii)) \leq 6.$$

DETAILED DESCRIPTION OF THE INVENTION

Figure 1:
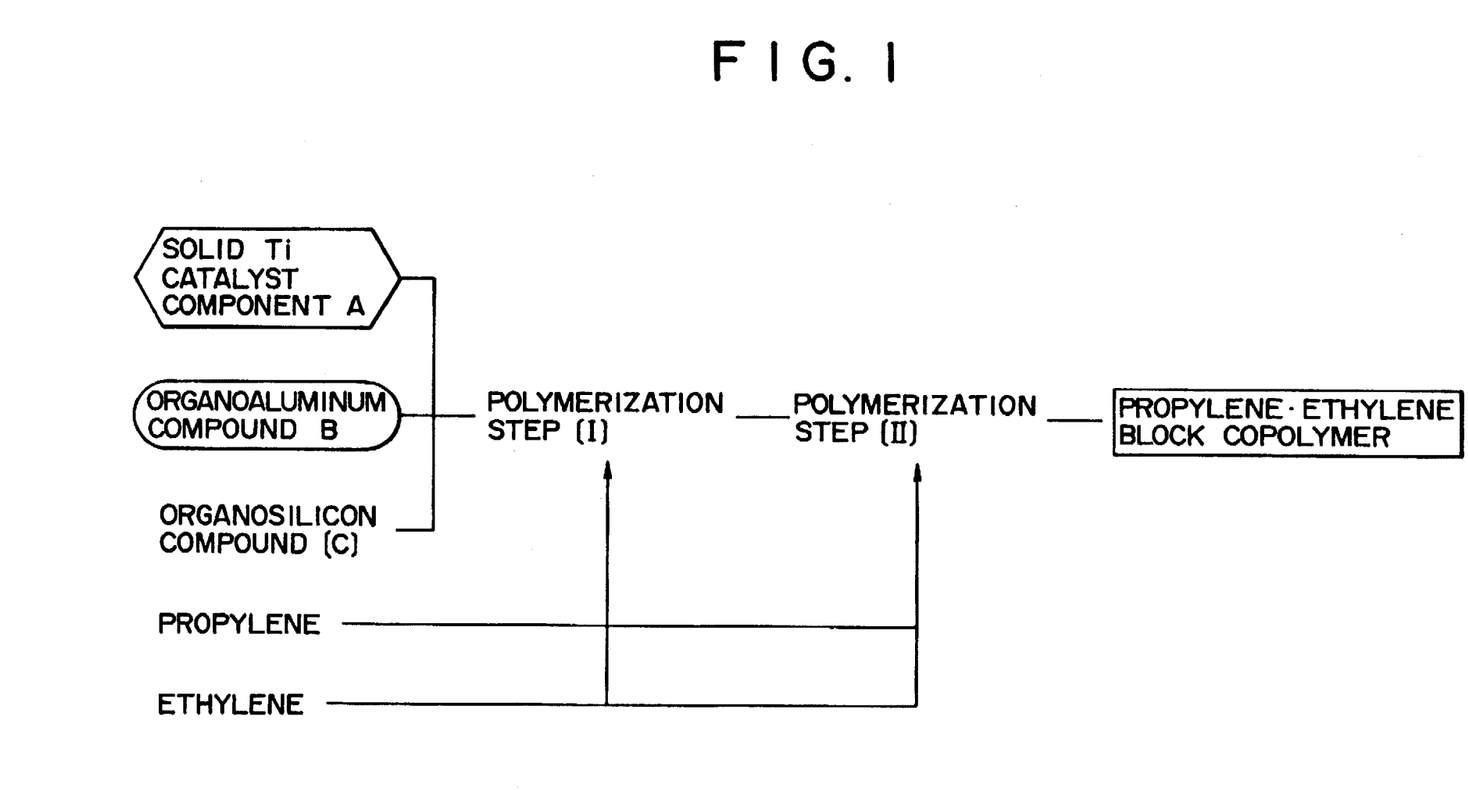
FIG.1 shows a flow sheet illustrating the production steps of the process of the present invention.

In the present invention, there is used a highly stereoregular catalyst system obtained by using as a polymerization catalyst, a solid catalyst component (A) containing at least Mg atom, Ti atom, halogen atom and a polyvalent carboxylic acid ester, an organoaluminum compound (B) and an electron-donating compound (C), but such a catalyst system has no particular limitation, and it is possible to use various known catalyst systems affording a highly stereoregular polypropylene.

Such a solid catalyst component (A) can be prepared for example according to the processes disclosed in the following publications:

Japanese patent application laid-open Nos. Sho 50-108385, Sho 50-126590, Sho 51-20297, Sho 51-28189, Sho 51-64586, Sho 51-92885, Sho 51-136625, Sho 52-87489, Sho 52-100596, Sho 52-147688, Sho 52-104593, Sho 53-2580, Sho 53-40093, Sho 53-40094, Sho 55-135102, Sho 55-135103, Sho 55-152710, Sho 56-811, Sho 56-11908, Sho 56-18606, Sho 58-83006, Sho 58-138705, Sho 58-138706, Sho 58-138707, Sho-58-138708, Sho 58-138709, Sho 58-138710, Sho 58-138715, Sho 60-23404, Sho 61-21109, Sho 61-37802, Sho 61-37803, Sho 62-104810, Sho 62-104811, Sho 62-104812, Sho 62-104813, Sho 63-54405, etc.

As to the polyvalent carboxylic acid ester used in the above solid catalyst component (A), its concrete examples are esters of phthalic acid, maleic acid, substituted malonic acid, etc. with an alcohol having two or more carbon atoms.

As to the Mg compound used in the above (A) in the present invention, various ones are mentioned, and Mg compound having a reducing capability or not having it is used.

Examples of the former are dimethylmagnesium, diethylmagnesium, dipropylmagnesium, dibutyl magnesium, ethylmagnesium chloride, propylmagnesium chloride, butylmagnesium chloride, etc.

Examples of the latter are magnesium halides such as magnesium chloride, magnesium bromide, magnesium iodide, etc., alkoxymagnesium chlorides such as methoxymagnesium chloride, ethoxymagnesium chloride, etc., alkoxymagnesiums such as ethoxymagnesium, isopropoxymagnesium, butoxymagnesium, etc., magnesium carboxylates such as magnesium laurate, magnesium stearate, etc.

Particularly preferable compounds among the foregoing are magnesium halides, alkoxymagnesium chlorides and alkoxymagnesiums.

As the Ti compounds used in the solid catalyst component (A) in the present invention, compounds usually represented by $Ti(OR)_A X_{4-A}$ (R: hydrocarbon radical, X: halogen; and $0 \leq A \leq 4$) are optimal. Concrete examples are titanium tetrahalides such as $TiCl_4$, $TiBr_4$, etc., alkoxytitanium trihalides such as $Ti(OCH_3)Cl_3$, $Ti(OCH_2H_5)Cl_3$, etc., dialkoxytitanium dihalides such as $Ti(OCH_3)_2Cl_2$, $Ti(OC_2H_5)_2Cl_2$, etc., trialkoxytitanium monohalides such as $Ti(OCH_3)_3Cl$, $Ti(OC_2H_5)_3Cl$, etc., tetraalkoxytitaniums such as $Ti(OCH_3)_4$, $Ti(OC_2H_5)_4$, etc. $TiCl_4$ particularly preferable.

In the preparation of the solid catalyst component (A), if necessary, it is possible to make an electron donor such as alcohol, ether, phenol, silicon compound, aluminum compound, etc., coexistent with the above Ti compound, Mg compound and polyvalent carboxylic acid ester.

As the organoaluminum compound (B) used in the present invention, it is possible to use an organoaluminum compound expressed by the formula $AlR^2{}_m R^3{}_n X_{3-(m+n)}$ wherein $R^2$ and $R^3$ each represent a hydrocarbon radical or an alkoxy group; X represents a halogen; m and n each represent an optional number of $0 \leq m \leq 3$, $0 \leq n \leq 3$ and $1.5 \leq m+n \leq 3$. Concrete examples are trimethylaluminum, triethylaluminum, tri-n-propylaluminum, tri-n-butylaluminum, tri-i-butylaluminum, diethylaluminum chloride, di-n-propylaluminum monochloride, diethylaluminum iodide, methylaluminum sesquichloride, ethylaluminum sesquichloride, ethoxy-diethylaluminum, etc.

These organoaluminum compounds (B) can be used alone or in admixture of two kinds or more.

As the electron donor component (C) used in the present invention, it is possible to use an organosilicon compound expressed by the formula of $R^4_xR^5_ySi(OR^6)_z$ wherein $R^4$ and $R^6$ each represent a hydrocarbon radical; $R^5$ represents a hydrocarbon radical or a hydrocarbon radical containing a hetero atom; $x+y+z=4$; $0 \leq x \leq 2$; $1 \leq y \leq 3$; $1 \leq Z \leq 3$.

Concrete examples are methyltrimethoxysilane, methyltriethoxysilane, methyltripropoxysilane, ethyltrimethoxysilane, ethyltriethoxysilane, ethyltripropoxysilane, n-propyltrimethoxysilane, n-propyltriethoxysilane, i-propyltrimethoxysilane, i-propyltriethoxysilane, n-butyltrimethoxysilane, n-butyltriethoxysilane, i-butyltrimethoxysilane, i-butyltriethoxysilane, t-butyltrimethoxysilane, t-butyltriethoxysilane, n-pentyltrimethoxysilane, n-pentyltriethoxysilane, neopentyltrimethoxysilane, neopentyltriethoxysilane, hexadecyltrimethoxysilane, hexadecyltriethoxysilane, dimethyldimethoxysilane, dimethyldiethoxysilane, diethyldimethoxysilane, diethyldiethoxysilane, di-n-propyldimethoxysilane, di-i-propyldimethoxysilane, di-n-butyldimethoxysilane, di-i-butyldimethoxysilane, di-t-butyldimethoxysilane, d-n-pentyldimethoxysilane, dineopentyldimethoxysilane, phenyltrimethoxysilane, phenyltriethoxysilane, diphenyldimethoxysilane, diphenyldiethoxysilane, cyclohexyltrimethoxysilane, cyclohexyltriethoxysilane, dicyclohexyldimethoxysilane, dicyclohexyldiethoxysilane, 3-mercaptopropylmethyldimethoxysilane, 3-isocyanatopropyltriethoxysilane, 2-(3-cyclohexenyl) ethyltrimethoxysilane, etc.

These organosilicon compounds can be used alone or in admixture of two or more kinds thereof in an optional proportion. The organosilicon compounds particularly preferred among them are di-i-propyldimethoxysilane, t-butyltriethoxysilane, t-butyltrimethoxysilane, i-butyltrimethoxysilane and cyclohexyltrimethoxysilane. Preferable quantity of the organosilicon compound (C) added is in a proportion of (B)/(C) of 1 to 15 relative to the quantity of the above organoaluminum compound (B). If the quantity is less than the above, improvement in the stiffness is insufficient, whereas if it is too much, the catalytic activity lowers; hence such quantities are not practical.

The solid catalyst component (A) is then combined with the organoaluminum compound (B) and the organosilicon compound (C) and used for propylene polymerization as its catalyst. Or more preferably, an α-olefin is reacted therewith and the resulting preactivated catalyst is used. This preactivation is carried out using the organo-aluminum (B) in a quantity of 0.3 to 20 mols relative to one mol of titanium in the preactivated catalyst component (A), at 0° to 50° C. for one minute to 20 hours, and reacting 0.1 to 10 mols, preferably 0.3 to 3 mols of the α-olefin.

The reaction of α-olefin for preactivation may be carried out in an aliphatic or aromatic hydrocarbon solvent or in liquefied α-olefin such as liquefied propylene, liquefied butene-1, etc. without using any solvent, and also ethylene, propylene, etc. can be reacted in gas phase. Further, an α-olefin polymer obtained in advance or hydrogen can be made coexistent. Still further, in the preactivation, an organosilane compound (C) can be added in advance.

α-Olefins used for the preactivation are linear chain monoolefins such as ethylene, propylene, butene-1, hexene-1, heptene-1, etc., branched chain monoolefins such as 4-methyl-pentene-1, 2-methyl-pentene-1, 3-methyl-butene-1, etc., styrene, etc. These α-olefins may be used in admixture with a α-olefins to be polymerized.

After completion of the preactivation, solvent, organoaluminum compound and unreacted α-olefin may be filtered off or removed by decantation or the resulting material can be dried and used as powder.

The resulting preactivated catalyst can be used in a slurry polymerization wherein propylene is polymerized in a hydrocarbon solvent such as n-hexane, n-heptane, n-octane, benzene, toluene, etc. or in bulk polymerization carried out in liquefied propylene, or in gas phase polymerization.

In the case of slurry polymerization, it is usually carried out at a polymerization temperature of 20° to 90° C., preferably 50° to 80° C. and under a polymerization pressure of 0.1 to 5 MPa. In the case of gas phase polymerization, it is usually carried out at a polymerization temperature of 20° to 150° C. and under a polymerization pressure of 0.3 to 5 MPa. For molecular weight control, hydrogen is usually used and the polymerization is carried out so that the resulting polymer may have an MFR in the range of 0.1 to 1,000.

As to the composition of monomers fed in the polymerization step (I), this step is carried out in a ratio of ethylene/(ethylene+propylene) of 0 to 5% by weight. If the ethylene content is higher than 5% by weight, there is a drawback that the physical properties of stiffness, heat resistance, etc. specific of polypropylene deteriorate.

Further, as a third component of monomers, it is possible to add 1-butene, 4-methylpentene-1, styrene, a non-conjugated diene or the like to propylene in a quantity of 0 to 10%.

The quantity polymerized i the polymerization step (I) is 60 to 95% by weight of the total quantity of the propylene.ethylene block copolymer composition finally obtained. If the polymerized quantity is less than the above range, the stiff surface of the product lowers, whereas if it is higher than the range, improvement in the low temperature impact strength is insufficient.

The polymerization of the polymerization step (I) is carried out using two or more polymerization vessels connected in series, and the relationship between the maximum value (MFR (h)) of the melt flow indexes of the polymers obtained in the respective vessels and the minimum value (MFR (1)) thereof consists in preferably $$0.1 \leq Log(MFR(h)/MFR(1)) \leq 1,$$

more preferably $$0.2 \leq Log(MFR(h)/MFR(1)) \leq 0.5.$$

If the M/R ratio is lower than the above, the stiffness of the product lowers, whereas if it is higher than the above, the tensile elongation and high-impact properties of the finally obtained propylene.ethylene block copolymer lower.

Further, the isotactic pentad ratio (P) of the polymer composition obtained at the polymerization step (I) is 0.96 or more, and the ratio (Q) of the weight average molecular weight (Mw) to the number average molecular weight (Mn), measured according to gel permeation chromatography (GPC) is 6 or less. If the isotactic pentad ratio (P) is lower than that of the present invention, the stiffness of the molded product lowers, whereas if the Q value is higher than that, the high-impact properties of the molded product lower.

The polymerization step (II) is carried out by copolymerizing ethylene with propylene usually at a polymerization temperature of 20° to 80° C., preferably 40° to 70° C. and under a pressure of 0.1 to 5 MPa. The process of feeding ethylene and propylene to the polymerization vessel and the polymerization mode are not limited. Hydrogen is usually used for controlling the molecular weight, and its concentration in gas phase is 0.1 to 10% by mol. The ratio of ethylene to propylene fed to the polymerization step (II) is 10 to 100% by weight in terms of ethylene/(ethylene+propylene), preferably 20 to 70% by weight, and the polymerized quantity is 5 to 40% by weight based upon the weight of the final propylene.ethylene block copolymer. Further, another α-olefin, non-conjugated diene or the like may be added to ethylene and propylene.

The polymerization of the polymerization step (II) is carried out using one polymerization vessel or two connected polymerization vessels.

The ethylene content in the part polymerized in the polymerization step is 30 to 80% by weight, preferably 40 to 70% by weight. If the ethylene content is outside the above range, the stiffness and high-impact properties of the resulting polymer are inferior. The quantity polymerized at the polymerization step (II) is 5 to 40% by weight based upon the total quantity of the finally obtained polymer. Another α-olefin, non-conjugated diene, etc. may be used together with ethylene and propylene.

The relationship between the MFR (i) of the polymer obtained at the polymerization step (I) and the MFR (ii) of the polymer obtained at the polymerization step (II) is preferred to be $$3 \leq Log(MFR(i)/MFR(ii)) \leq 7,$$

and more preferred to be $$4 \leq Log(MFR(i)/MFR(ii)) \leq 6.$$

The MFR (i) is an observed value of only a polymer at the polymerization step (I), and the MFR (ii) is a value calculated from the observed value of an MFR (referred to as MFR (i+ii)), after completion of the second step; a polymer fraction (W1) at the polymerization step (I); and the polymer fraction (W2) at the polymerization step (II), according to the following equations (2) and (3):

$$Log\ MFR(T)=W1\times Log\ MFR(i)+W2\times Log\ MFR\ (ii) \quad (2)$$

$$W1+W2=1 \quad (3)$$

In the case of Log (MFR (i)/MFR (ii))<3, the resulting polymer is inferior in the impact strength at low temperature, tensile elongation, etc. Further, a polymer soluble in polymerization solvent is formed in a large quantity; hence the economy and the driving property of plant are inferior.

Further, in the case of Log (MFR(i)/MFR(ii))>7, the polymer yield per unit catalyst is low; hence the case is unpractical.

The MFR of the finally obtained polymer is preferably in the range of 0.1 to 100, more preferably in the range of 1 to 80. If the MFR is less than that of the present invention, the moldability lowers, whereas if the MFR is larger than that of the present invention, the high-impact properties lower.

In order to improve the stiffness, heat resistance (heat-resistant stiffness, thermal deformation temperature, etc. ), dimentions stability (percentage of molding shrinkage, warpage deformation of molded product, etc.), coatability, abrasion resistance, etc., it is possible to blend an inorganic filler with the highly stiff propylene.ethylene block copolymer composition, within a range of quantity which does not damage the object of the present invention, and as such a range, for example, preferably 0.1 to 30 parts by weight, more preferably 0.1 to 25 parts by weight of the filler can be blended with 100 parts by weight of the highly stiff propylene.ethylene block copolymer composition.

Examples of the inorganic filler are talc, calcium carbonate, potassium titanate whisker, mica, glass fiber, barium sulfate, magnesium sulfate, etc. They may be used singly or in admixture. Among these inorganic fillers, talc is preferable, and its average particle diameter is 5 μm or less, preferably 2 μm or less in the aspect of high-impact properties, and the component of talc having particle diameters exceeding 10 μm is 5% by weight or less, and it is preferably 1% by weight or less in the aspect of the high-impact properties.

In order to improve the high-impact properties, dimensional stability (linear expansion coefficient, warpage deformation of molded product, etc. ), coating properties, etc., it is possible to blend with the highly stiff propylene.ethylene block copolymer composition of the present invention, non-crystalline or low crystalline ethylene.α-olefin copolymer, polyethylene (high density polyethylene, low density polyethylene, linear low density polyethylene, super low density polyethylene, etc. ) or styrene group elastomer, in the range of quantity in which the object of the present invention is not damaged, and as the range, for example, it is possible to blend 1 to 20 parts by weight, preferably 1 to 10 parts by weight of non-crystalline or low crystalline ethylene.α-olefin copolymer, with 100 parts by weight of the highly stiff propylene.ethylene block copolymer composition.

As the non-crystalline or low crystalline ethylene.α-olefin copolymer, non-crystalline ethylene-propylene copolymer, non-crystalline ethylene.1-butene copolymer, etc. are mentioned. Among them, non-crystalline ethylene.α-olefin copolymers are preferred. Example of the non-crystalline ethylene-.α-olefin copolymers is non-crystalline ethylene.propylene copolymer having a propylene content of 20 to 50% by weight, preferably 20 to 35% by weight, a Mooney viscosity [ML1+4 (100° C. )] of 5 to 60, preferably 10 to 50, and an MFR (230° C. ; 21.18N) of 0.1 to 20 g/10 min., preferably 0.5 to 10 g/10 min.

Further, if necessary, it is possible to blend with the highly stiff propylene.ethylene block copolymer composition of the present invention, one or more kinds of various additives such as antioxidant, antistatic agent, coloring agent (pigment), nucleating agent, release agent, fire retardant, ultraviolet absorber, weathering agent, plasticizer, radical generator, etc., within a range of quantity in which the object of the present invention is not damaged.

In addition, the analyses and the measurement methods of various physical properties in Examples mentioned later are shown below.

MFR: according to ASTM D-1238 (unit: g/10 min), 230° C., 2.16 Kg load

Ethylene content: according to infrared absorption spectra (unit: % by weight)

Ratio of polymerized quantities ($W_1$, $W_2$) at polymerization step (I) and polymerization step (II):

It was determined as follows:

Copolymers having varied the reacted quantity ratio of ethylene/propylene are prepared in advance, followed by preparing calibration curves with infrared absorption spectra, employing these copolymers as standard samples, seeking the reacted quantity ratio of the ethylene/propylene at the polymerization step (II), and further calculating from the ethylene content in the total polymer (weight/weight).

Bending modulus: according to JIS K7203 (unit: MPa)
Tensile strength: according to JIS K7113 (unit: MPa)
Tensile elongation: according to JIS K7113 (unit: %)
HDT: according to JIS K7207 (unit: ° C.)
Izod impact strength: according to JIS K7110 (unit: J/m)

As described above, the present invention is directed to a production process by which an effectiveness exceeding the prior art to a large extent could have been achieved, and it will be described by way of Examples in more detail, but it should not be construed to be limited thereto

EXAMPLE 1

(Preparation of Catalyst-Preparation of Solid Ti Catalyst Component)

A mixture of magnesium ethoxide (150 g), 2-ethylhexyl alcohol (275 ml) and toluene (300 ml) was agitated at 93° C. for 3 hours in 0.3 MPa $CO_2$ atmosphere, followed by adding toluene (400 ml) and n-decane (400 ml). The resulting solution will be hereinafter referred to as a magnesium carbonate solution.

Toluene (100 ml), chlorobenzene (30 ml), tetraethoxysilane (9 ml), $TiCl_4$ (8.5 ml) and Isopar G (isoparaffin hydrocarbon having an average carbon number of 10, b.p. : 156°–176° C.) (100 ml) were agitated at 30° C. for 5 minutes and the above magnesium carbonate solution (50 ml) was added thereto.

The mixture was agitated for 5 min., followed by adding tetrahydrofuran (22 ml), agitating at 60° C. for one hour, stopping the agitation, removing the supernatant, washing the resulting solids with toluene (50 ml), adding chlorobenzene (100 ml) and $TiCl_4$ (100 ml), and agitating the mixture at 135° C. for one hour, stopping the agitation, removing the supernatant, adding chlorobenzene (250 ml), $TiCl_4$ (100 ml) and di-n-butyl phthalate (2.1 ml), agitating at 135° C. for 1.5 hour, removing the supernatant, washing the solids successively with toluene (600 ml), Isopar G (800 ml) and hexane (400 ml) and adopting the resulting solid catalyst component. The composition of this component was Ti (2.3% by weight), Cl (55% by weight), Mg (17% by weight) and di-n-butyl phthalate (7.5% by weight).

Preparation of Preactivated Catalyst

The inside of a 50 l capacity, stainless reactor provided with slant blades was purged with nitrogen gas, followed by feeding n-hexane (40 l), adding the above solid product (75 g) and triethylaluminum (13 g) at room temperature, feeding propylene (100 g) over 120 min., and removing unreacted propylene and n-hexane under reduced pressure, to obtain a preactivated catalyst (150 g).

Polymerization Step (I)

Into a 500 l capacity stainless polymerization vessel provided with turbine type, agitating blades, and purged with nitrogen gas, were fed n-hexane (250l), and then triethylaluminum (89 g) and di-i-propyldimethoxysilane (69g) as an organosilicon compound, thereafter feeding the above preactivated catalyst (15 g), elevating the reactor inside temperature up to 70° C., feeding propylene and hydrogen, while maintaining the total pressure at 0.8 MPa and the concentration ratio of hydrogen/propylene at the gas phase part at 0.24, to carry out the first step polymerization for one hour, stopping the feed of propylene, cooling the reactor inside temperature down to 30° C., and discharging hydrogen and unreacted propylene.

A portion of the polymerized slurry was then discharged, followed by carrying out MFR measurement and induction bonding plasma emission stereoscopic analysis (ICP method) of Mg content in the polymer, to seek the polymer yield per the catalyst unit weight. The temperature inside the vessel was elevated up to 70° C., followed by feeding propylene and hydrogen, and carrying out the second step polymerization for one hour, while keeping the total pressure at 1.0 MPa and the concentration ratio of hydrogen/propylene in the gas phase part at 0.24, stopping the propylene feed, cooling the temperature inside the vessel down to 30° C., discharging hydrogen and unreacted propylene, thereafter withdrawing a portion of the polymerized slurry, carrying out MFR measurement and at the same time seeking Mg content in the polymer according to ICP method, to seek the polymer yield at the second step, and then seeking the proportion of the polymerized quantities at the first step and the second step, using the above yield value at the first step. Further, values of $MFR_1$ and MFR were substituted in the following equation:

$$\log MFR = a \times \log MFR_1 + (1-a) \times \log MFR_2$$

wherein a: polymerization proportion at the first step,

MFR: MFR of a product withdrawn after completion of the second step, and $MFR_1$ and $MFR_2$: MFRs at the first step and the second step, to seek $MFR_2$ at the second step.

Thereafter, the temperature inside the vessel was elevated up to 70° C., followed by feeding propylene and hydrogen, carrying out polymerization at the third step for one hour, while keeping the total pressure at 1.2 MPa and the concentration ratio of hydrogen/propylene at the gas phase part, at 24%, stopping propylene feed, cooling the temperature inside the vessel down to 30° C., discharging hydrogen and unreacted propylene, withdrawing a portion of the polymerized slurry, measuring MFR and at the same time seeking Mg content in the polymer according to ICP method, to seek the polymerization proportion at the third step.

Further, values of $MFR_1$, $MFR_2$ and $MFR_3$ were substituted in the following equations:

$$\log MF = a \times \log MFR_1 + b \times \log MFR_2 + c \times \log MFR_3, a+b+c=1$$

wherein a: polymerization proportion at the first step, b: polymerization proportion at the second step and c: polymerization proportion at the third step, MFR: MFR of product withdrawn after completion of the third step, to obtain $MFR_3$ at the third step.

Polymerization step (2)

The temperature inside the vessel was elevated up to 60° C., followed by continuously feeding ethylene and propylene for 2 hours, so as to give a proportion of ethylene fed, of 35% by weight. The total quantity of ethylene fed was 4.5 Kg. During the polymerization, hydrogen was fed so as to give a hydrogen concentration in gas phase of 1% by mol. After polymerization for 2 hours, feed of ethylene and propylene was stopped, followed by cooling the temperature inside the vessel down to 30° C. and then discharging unreacted ethylene and propylene.

Methanol (50l) was fed in the polymerization vessel, followed by raising the temperature inside the vessel up to 60° C., further after 30 minutes, adding a 20% by weight aqueous solution of NaOH (0.5 l), agitating the mixture for 20 minutes, adding purified water (100 l), cooling the temperature inside the vessel down to 30° C., withdrawing the aqueous layer, further adding purified water (300 l), washing with water with stirring for 10 minutes, withdrawing the aqueous layer, withdrawing the hexane slurry, filtering and drying, and analyzing the resulting propylene-.ethylene block copolymer, these values being shown in Table 1.

Production of Injection-Molded Product

To the product powder obtained above (3.0 Kg) were added a phenolic heat-stabilizer (0.003 Kg) and calcium stearate (0.003 Kg), followed by mixing them at room temperature for 10 minutes by means of a high speed mixing type mixer (Henschel mixer (trade name)), granulating the mixture by means of an extrusion-granulator having a screw diameter (40 mm), subjecting the granulated material to injection molding by means of an injection molding machine, at a melted resin temperature of 230° C. and at a mold temperature of 50° C. to prepare a test piece of JIS form, and subjecting this test piece to conditioning in a chamber of a humidity 50% and room temperature (23° C. ) for 72 hours. Thereafter, the values of physical properties were measured as seen in Table 1.

EXAMPLES 2 AND 3 COMPARATIVE EXAMPLES 1 AND 2

Example 1 was repeated except that the quantity of di-i-propyldimethoxysilane added in polymerization step (I) was varied to 27.4 g, 13.7 g, 6.9 g and 172 g. The results are shown in Table 1. When the molar ratio (B/C) of organoaluminum compound (B) to organosilicon compound (C) is higher than that of the present invention, the stiffness of the resulting molded product is inferior, whereas when the ratio is lower than that, the yield of the polymer per unit catalyst lowers and this is unpractical.

In other words, when the isotactic pentad fraction (P) of the polymer obtained at the polymerization step (I) is less than that of the present invention, the stiffness of the molded product is inferior.

TABLE 1

Polymerization results and physical properties of product

|  | Example 1 | Example 2 | Example 3 | Comp. ex. 1 | Comp. ex. 2 |
|---|---|---|---|---|---|
| Solid catalyst component (A) | Present invention | → | → | → | → |
| Organoaluminum compound (B) | TEA | → | → | → | → |
| Organosilicon compound (C) | DiPDMS* | → | → | → | → |
| B/C molar ratio | 2 | 5 | 10 | 20 | 0.8 |
| Polymerization step (I) | | | | | |
| 1st step MFR g/10 min. | 122 | 128 | 118 | 120 | 119 |
| 2nd step MFR g/10 min. | 100 | 105 | 102 | 105 | 103 |
| 3rd step MFR g/10 min. | 70 | 66 | 78 | 75 | 69 |
| log(MFR(h)/MFR(l)) | 0.24 | 0.29 | 0.18 | 0.20 | 0.23 |
| Ratio of polymerized quantities 1st step:2nd step:3rd step | 35:33:32 | 33:34:33 | 34:33:33 | 33:34:33 | 34:33:33 |
| MFR(i) g/10 min. | 96 | 96 | 98 | 98 | 95 |
| Polymerization step (II) | 0.005 | 0.006 | 0.004 | 0.005 | 0.005 |
| MFR(ii): g/10 min. | | | | | |
| Ratio of polymerized quantities Polymerization (I):polymerization (II) | 88:12 | 87:13 | 88:12 | 87:13 | 87:13 |
| Product powder | | | | | |
| MFR g/10 min. | 29 | 27 | 29 | 27 | 26 |
| log(MFR(i)/MFR(ii)) | 4.3 | 4.2 | 4.3 | 4.3 | 4.3 |
| R-E* wt % | 48 | 51 | 49 | 50 | 52 |
| T-E* wt % | 6.3 | 6.4 | 5.9 | 6.5 | 6.8 |
| Yield Kg | 50 | 60 | 65 | 66 | 30 |
| Soluble polymer % | 2.2 | 2.5 | 2.8 | 5.1 | 3.2 |
| Injection-molded product | | | | | |
| Bending modulus Mpa | 1570 | 1530 | 1510 | 1380 | 1520 |
| Tensile strength Mpa | 38 | 37 | 37 | 35 | 38 |
| Tensile elongation % | 340 | 380 | 440 | 165 | 182 |
| HDT °C. | 118 | 117 | 117 | 112 | 117 |
| II* J/m | 98 | 101 | 96 | 95 | 96 |

(Note)
DiPDMS*: di-i-propyldimethoxysilane (this applies to Table 2 et seq.)
R-E*: Ethylene content in portion polymerized at polymerization step (II) (this applies to Table 2 et seq.)
T-E*: Ethylene content in total polymer (this applies to Table 2 et seq.)
II*: Izodt - impact (this applies to Table 2 et seq.)

EXAMPLE 4

Example 2 was repeated except that the concentration ratios of hydrogen/propylene in the gas phase parts of 1st step, 2nd step and 3rd step of the polymerization step (I) was respectively varied to 0.3, 0.23 and 0.16. The results are shown in Table 2.

EXAMPLE 5

Example 4 was repeated except that the concentration ratios of hydrogen/propylene in the gas phase parts of 1st step and 2nd step of the polymerization step (I) were varied to 0.22, the polymerization times at the respective steps were varied to 1.5 hour and the polymerization at the 3rd step was omitted. The results are shown in Table 2.

COMPARATIVE EXAMPLE 3

Example 5 was repeated except that the concentration ratios of hydrogen/propylene in the gas phase parts of 1st step and second step were respectively varied to 0.21 and 0.23, and the polymerization times at the respective steps were varied to 1.5 hour. The results are shown in Table 2. Since the value of log(MFR(h)/MFR(1)) is lower than that of the present invention, the stiffness of the molded product is inferior to that of the product of the present invention.

COMPARATIVE EXAMPLE 4

Example 4 was repeated except that the concentration ratio of hydrogen/propylene at the 1st step of the polymerization step (I) was varied to 0.18, the polymerization time was varied to 3 hours and the 2nd and 3rd step polymerizations were omitted. The results are shown in Table 2. The stiffness of the resulting product is inferior to that of the present invention.

COMPARATIVE EXAMPLE 5

Example 4 was repeated except that the concentration ratios of hydrogen/propylene in the gas phase parts of 1st step, 2nd step and 3rd step of the polymerization step (I) were respectively varied to 0.45, 0.23 and 0.10. The results are shown in Table 2. Since the value of log(MFR(h)/MFR (1)) is higher than that of the present invention, the high-impact properties of the resulting molded product is inferior.

EXAMPLE 6

Example 2 was repeated except that the concentration ratios of hydrogen/propylene in the gas phase parts of 1st step, 2nd step and 3rd step of the polymerization step (I) were varied to 0.35 and the hydrogen concentration in gas phase of the polymerization step (II) was varied to 0.2% by mol. The results are shown in Table 3.

EXAMPLE 7

Example 2 was repeated except that the concentration ratios of hydrogen/propylene in the gas phase parts of 1st step, 2nd step and 3rd step of the polymerization step (I) were respectively varied to 0.20, and the gas phase hydrogen concentration at the polymerization step (II) was varied to 3% by mol. The results are shown in Table 3.

COMPARATIVE EXAMPLE 6

Example 2 was repeated except that the concentration ratios of hydrogen/propylene in the gas phase parts of 1st step, 2nd step and 3rd step of the polymerization step (I) were varied to 0.60, and the gas phase hydrogen concentration at the polymerization step (II) was varied to 0.05% by mol. The results are shown in Table 3. Since the MFR ratio (log(R(i)/MFR(ii)) at the polymerization step (I) and the polymerization step (II) is higher than that of the present invention, the high-impact properties are inferior and also the polymer yield per unit catalyst lowers.

COMPARATIVE EXAMPLE 7

Example 2 was repeated except that the concentration ratios of hydrogen/propylene at the gas phase part of 1st step, 2nd step and 3rd step of the polymerization step (I) were respectively varied to 0.18 and the gas phase hydrogen concentration at the polymerization step (II) was varied to 10% by mol. The results are shown in Table 3. Since the

TABLE 2

Polymerization results and physical properties of product

| | Example 4 | Example 5 | Comp. ex. 3 | Comp. ex. 4 | Comp. ex. 5 |
|---|---|---|---|---|---|
| Solid catalyst component (A) | Present invention | → | → | → | → |
| Organoaluminum compound (B) | TEA | → | → | → | → |
| Organosilicon compound (C) | DiPDMS* | → | → | → | → |
| B/C molar ratio | 5 | → | → | → | → |
| Polymerization step (I) | | | | | |
| 1st step MFR g/10 min. | 200 | 110 | 105 | 100 | 300 |
| 2nd step MFR g/10 min. | 105 | 80 | 90 | — | 100 |
| 3rd step MFR g/10 min. | 40 | — | — | — | 20 |
| log(MFR(h)/MFR(1)) | 0.70 | 0.14 | 0.067 | — | 1.2 |
| Ratio of polymerized quantities 1st step:2nd step:3rd step | 33:33:34 | 52:48 | 50:50 | — | 45:35:25 |
| MFR(i) g/10 min. | 94 | 94 | 97 | 100 | 110 |
| Polymerization step (II) | 0.006 | 0.004 | 0.005 | 0.005 | 0.005 |
| MFR(ii): g/10 min. | | | | | |
| Ratio of polymerized quantities Polymerization (I):polymerization (II) | 88:12 | 87:13 | 87:13 | 88:12 | 88:12 |
| Product powder | | | | | |
| MFR g/10 min. | 29 | 25 | 28 | 28 | 28 |
| log(MFR(i)/MFR(ii)) | 4.3 | 4.5 | 4.3 | 4.3 | 4.3 |
| R-E wt % | 48 | 52 | 51 | 51 | 51 |
| T-E wt % | 6.3 | 6.8 | 6.4 | 6.4 | 6.4 |
| Yield Kg | 55 | 62 | 50 | 55 | 55 |
| Soluble polymer % | 2.2 | 2.5 | 2.6 | 2.4 | 2.5 |
| Injection-molded product | | | | | |
| Bending modulus Mpa | 1580 | 1520 | 1480 | 1450 | 1560 |
| Tensile strength Mpa | 38 | 37 | 36 | 35 | 37 |
| Tensile elongation % | 180 | >800 | >800 | >800 | 30 |
| HDT °C. | 118 | 117 | 115 | 115 | 117 |
| II* J/m | 98 | 102 | 99 | 101 | 86 |

MFR ratio (log(MFR(i)/MFR(ii))) at the polymerization step (I) and the polymerization step (II) is lower than that of the present invention, the stiffness, high-impact properties and tensile elongation are inferior to those of the present invention and also, the formed quantity of polymer soluble in polymerization solvent, increases.

TABLE 3

Polymerization results and physical properties of product

|  | Example 6 | Example 7 | Comp. ex. 6 | Comp. ex. 7 |
|---|---|---|---|---|
| Solid catalyst component (A) | Present invention | → | → | → |
| Organoaluminum compound (B) | TEA | → | → | → |
| Organosilicon compound (C) | DiPDMS* | → | → | → |
| B/C molar ratio | 5 | → | → | → |
| Polymerization step (I) | | | | |
| 1st step MFR g/10 min. | 250 | 100 | 400 | 70 |
| 2nd step MFR g/10 min. | 180 | 70 | 310 | 50 |
| 3rd step MFR g/10 min. | 120 | 50 | 220 | 40 |
| log(MFR(h)/MFR(1)) | 0.32 | 0.30 | 0.26 | 0.24 |
| Ratio of polymerized quantities 1st step:2nd step:3rd step | 34:33:33 | 33:34:33 | 34:33:33 | 34:33:33 |
| MFR(i) g/10 min. | 176 | 70 | 302 | 52 |
| Polymerization step (II) | 0.00005 | 0.05 | 0.00001 | 0.2 |
| MFR(ii): g/10 min. | | | | |
| Ratio of polymerized quantities Polymerization (I):Polymerization (II) | 88:12 | 87:13 | 87:13 | 88:12 |
| Product powder | | | | |
| MFR g/10 min. | 29 | 28 | 32 | 27 |
| log(MFR(i)/MFR(ii)) | 6.5 | 3.1 | 7.5 | 2.4 |
| R-E wt % | 48 | 51 | 51 | 51 |
| T-E wt % | 6.3 | 6.4 | 6.4 | 6.4 |
| Yield Kg | 52 | 60 | 35 | 58 |
| Soluble polymer % | 1.8 | 3.0 | 2.0 | 5.2 |
| Injection-molded product | | | | |
| Bending modulus Mpa | 1590 | 1530 | 1550 | 1420 |
| Tensile strength Mpa | 39 | 38 | 38 | 36 |
| Tensile elongation % | 440 | 180 | 220 | 50 |
| HDT °C. | 119 | 118 | 118 | 115 |
| II* J/m | 106 | 97 | 95 | 88 |

EXAMPLE 8

Example 3 was repeated except that the concentration ratios of hydrogen/propylene in the gas phase parts at the 1st step, the 2nd step and the 3rd step in the polymerization step (I) were varied to 0.08, the gas phase hydrogen concentration at the second step (II) was varied to 0.5% by mol and the total quantity of ethylene fed was varied to 2 Kg. The results are shown in Table 4.

EXAMPLE 9

Example 3 was repeated except that the concentration ratios of hydrogen/propylene in the gas phase parts of the 1st step, the 2nd step and 3rd step in the polymerization step (I) were varied to 0.17, the gas phase hydrogen concentration in the polymerization step was varied to 0.5% by mol, the proportion of ethylene fed was varied to 65% by weight and the total quantity of ethylene fed was varied to 7 Kg. The results are shown in Table 4.

COMPARATIVE EXAMPLE 8

Example 9 was repeated except that ethyl benzoate was used as the electron donor in the preparation of the solid catalyst component (A). The results are shown in Table 4. The stiffness and the high-impact properties are far inferior to those of the present invention.

COMPARATIVE EXAMPLE 9

Example 9 was repeated except that a reduction type catalyst described in Example of Japanese patent application laid-open No. Sho 58-201816 was used as the solid catalyst component (A), diethylaluminum chloride was used as the organoaluminum compound (B) and methyl p-toluylate was used in place of the organo-silicon compound (C). The results are shown in Table 4. The stiffness and the high-impact properties are inferior and the yield of the polymer per unit catalyst is lower as compared with those of the present invention.

TABLE 4

Polymerization results and physical properties of product

|  | Example 8 | Example 9 | Comp. ex. 8 | Comp. ex. 9 |
|---|---|---|---|---|
| Solid catalyst component (A) | Present invention | → | Supported type* | Reduction type* |
| Organoaluminum compound (B) | TEA | → | → | DEAC |
| Organosilicon compound (C) | DiPDMS* | → | → | *1 |
| B/C molar ratio | 10 | → | → | → |
| Polymerization step (I) |  |  |  |  |
| 1st step MFR g/10 min. | 30 | 64 | 33 | 31 |
| 2nd step MFR g/10 min. | 20 | 44 | 21 | 22 |
| 3rd step MFR g/10 min. | 14 | 36 | 17 | 19 |
| log(MFR(h)/MFR(1)) | 0.33 | 0.24 | 0.29 | 0.22 |
| Ratio of polymerized quantities 1st step:2nd step:3rd step | 38:35:32 | 35:32:33 | 34:33:33 | 34:34:32 |
| MFR(i) g/10 min. | 24 | 47 | 23 | 24 |
| Polymerization step (II) | 0.001 | 0.002 | 0.0006 | 0.0005 |
| MFR(ii): g/10 min. |  |  |  |  |
| Ratio of polymerized quantities Polymerization (I):Polymerization (II) | 94:6 | 79:21 | 78:22 | 79:21 |
| Product powder |  |  |  |  |
| MFR g/10 min. | 13 | 5.7 | 2.3 | 2.5 |
| log(MFR(i)/MFR(ii)) | 4.4 | 4.4 | 4.8 | 4.7 |
| R-E wt % | 48 | 65 | 66 | 65 |
| T-E wt % | 2.9 | 13.7 | 13.9 | 13.7 |
| Yield Kg | 55 | 66 | 60 | 50 |
| Soluble polymer % | 1.5 | 3.2 | 6.6 | 6.4 |
| Injection-molded product |  |  |  |  |
| Bending modulus Mpa | 1730 | 1310 | 980 | 1260 |
| Tensile strength Mpa | 38 | 29 | 22 | 28 |
| Tensile elongation % | 440 | >800 | >800 | 55 |
| HDT °C. | 119 | 110 | 96 | 103 |
| II* J/m | 76 | 190 | 152 | 125 |

Supported type*: Catalyst obtained by using ethyl benzoate as the electron donor.
Reduction type*: Catalyst used in Example of Japanese patent application laid-open No. Sho 58-201816
*1: Methyl p-toluylate was used.

EXAMPLES 10 to 14

Example 2 was repeated except that t-butyltrimethoxysilane, t-butyltriethoxysilane, i-butyltrimethoxysilane, cyclohexyltrimethoxysilane or di-i-butyldimethoxysilane was used as the organosilicon compound. The results are shown in Table 5.

TABLE 5

Polymerization results and physical properties of product

|  | Example 10 | Example 11 | Example 12 | Example 13 | Example 14 |
|---|---|---|---|---|---|
| Solid catalyst component (A) | Present invention | → | → | → | → |
| Organoaluminum compound (B) | TEA | → | → | → | → |
| Organosilicon compound (C) | t-BTMS* | 5-BTES* | i-BTMS* | SHTMSi* | DiBDMS* |
| B/C molar ratio | 5 | → | → | → | → |
| Polymerization step (I) |  |  |  |  |  |
| 1st step MFR g/10 min. | 130 | 128 | 125 | 133 | 129 |
| 2nd step MFR g/10 min. | 110 | 108 | 107 | 102 | 108 |
| 3rd step MFR g/10 min. | 65 | 61 | 63 | 66 | 65 |
| log(MFR(h)/MFR(1)) | 0.30 | 0.32 | 0.30 | 0.30 | 0.30 |
| Ratio of polymerized quantities 1st step:2nd step:3rd step | 34:33:33 | 33:34:33 | 35:33:32 | 33:34:33 | 34:33:32 |
| MFR(i) g/10 min. | 98 | 95 | 95 | 96 | 97 |
| Polymerization step (II) | 0.005 | 0.006 | 0.006 | 0.006 | 0.005 |
| MFR(ii): g/10 min. |  |  |  |  |  |
| Ratio of polymerized quantities Polymerization (I):polymerization (II) | 88:12 | 87:13 | 87:13 | 88:12 | 88:12 |

TABLE 5-continued

Polymerization results and physical properties of product

|  | Example 10 | Example 11 | Example 12 | Example 13 | Example 14 |
|---|---|---|---|---|---|
| Product powder |  |  |  |  |  |
| MFR g/10 min. | 30 | 27 | 27 | 30 | 30 |
| log(MFR(i)/MFR(ii)) | 4.3 | 4.2 | 4.2 | 4.2 | 4.3 |
| R-E wt % | 51 | 50 | 52 | 49 | 51 |
| T-E wt % | 6.1 | 6.5 | 6.8 | 5.9 | 6.1 |
| Yield Kg | 55 | 52 | 53 | 55 | 62 |
| Soluble polymer % | 2.8 | 2.9 | 2.8 | 3.1 | 3.3 |
| Injection-molded product |  |  |  |  |  |
| Bending modulus Mpa | 1520 | 1510 | 1530 | 1540 | 1480 |
| Tensile strength Mpa | 37 | 37 | 37 | 37 | 36 |
| Tensile elongation % | 370 | 385 | 390 | 350 | 380 |
| HDT °C. | 116 | 116 | 117 | 117 | 116 |
| II* J/m | 100 | 102 | 99 | 98 | 101 |

(Note)
t-BTMS*: t-butyltrimethoxysilane
t-BTES*: t-butyltriethoxysilane
i-BTMS*: i-butyltrimethoxysilane
SHTMS*: cyclohexyltrimethoxysilane
DiBDMS*: di-i-butyldimethoxysilane

COMPARATIVE EXAMPLES 10-13

Example 2 was repeated except that methyl p-toluylate, triethylamine, acetophenone or diethylene glycol dimethyl ether was used as the electron donor in place of the organosilicon compound. The results are shown in Table 6. The stiffness is inferior and also the quantity of the polymer soluble in the polymerization solvent formed is larger, as compared with the present invention.

TABLE 6

Polymerization results and physical properties of product

|  | Comp. ex. 10 | Comp. ex. 11 | Comp. ex. 12 | Comp. ex. 13 |
|---|---|---|---|---|
| Solid catalyst component (A) | Present invention | → | → | → |
| Organoaluminum compound (B) | TEA | → | → | → |
| Organosilicon compound (C) | A* | B* | C* | D* |
| B/C molar ratio | 5 | → | → | → |
| Polymerization step (I) |  |  |  |  |
| 1st step MFR g/10 min. | 128 | 129 | 130 | 128 |
| 2nd step MFR g/10 min. | 110 | 112 | 108 | 105 |
| 3rd step MFR g/10 min. | 70 | 65 | 63 | 66 |
| log(MFR(h)/MFR(1)) | 0.26 | 0.30 | 0.31 | 0.29 |
| Ratio of polymerized quantities 1st step:2nd step:3rd step | 34:33:33 | 33:34:33 | 35:33:32 | 33:34:33 |
| MFR(i) g/10 min. | 100 | 98 | 97 | 96 |
| Polymerization step (II) | 0.006 | 0.004 | 0.006 | 0.005 |
| MFR(ii): g/10 min. |  |  |  |  |
| Ratio of polymerized quantities Polymerization (I):polymerization (II) | 87:13 | 87:13 | 88:12 | 87:13 |
| Product powder |  |  |  |  |
| MFR g/10 min. | 28 | 26 | 30 | 27 |
| log(MFR(i)/MFR(ii)) | 4.2 | 4.4 | 4.2 | 4.3 |
| R-E wt % | 48 | 51 | 50 | 51 |
| T-E wt % | 6.2 | 6.6 | 6.0 | 6.6 |
| Yield Kg | 35 | 45 | 48 | 44 |
| Soluble polymer % | 5.8 | 4.9 | 4.5 | 6.6 |
| Injection-molded product |  |  |  |  |
| Bending modulus Mpa | 1230 | 1380 | 1330 | 1240 |
| Tensile strength Mpa | 30 | 32 | 31 | 28 |

TABLE 6-continued

| Polymerization results and physical properties of product | | | | |
|---|---|---|---|---|
| | Comp. ex. 10 | Comp. ex. 11 | Comp. ex. 12 | Comp. ex. 13 |
| Tensile elongation % | 120 | 155 | 145 | 160 |
| HDT °C. | 102 | 108 | 106 | 101 |
| II* J/m | 95 | 92 | 98 | 95 |

Note:
A*: methyl p-toluylate
B*: triethylamine
C*: acetophenone
D*: diethylene glycol dimethyl ether

EXAMPLE 15 AND COMPARATIVE EXAMPLES 14 AND 15

Example 1 was repeated except that the proportion of ethylene fed in the polymerization step (II) was respectively varied to 25% by weight, 15% by weight and 90% by weight, and the total quantity of ethylene fed were varied to 3.5 Kg, 2.5 Kg and 7.0 Kg. The results are shown in Table 7. As compared with Example 15, in Comparative example 14, the content of ethylene in the portion polymerized in the polymerization step (II) is lower than that of the present invention; hence the stiffness and the high-impact properties of the resulting molded product are inferior, and in Comparative example 15, the ethylene content is higher; hence the tensile elongation and the high-impact properties are inferior.

EXAMPLE 16

To the product powder (3.0 Kg) of the propylene.ethylene block copolymer composition obtained in Example 2 were added a phenolic heat stabilizer (0.003 Kg), calcium stearate (0.003 Kg) and talc (0.03 Kg) (bulk density: 0.39 and average particle diameter: 10 μm), followed by blending them at room temperature for 10 minutes by means of a high speed agitation type mixer (Henschel mixer, trade name), granulating the blend by means of an extrusion-granulator having a screw diameter of 40 mm, subjecting the resulting granulate to an injection-molding machine at a molten resin temperature of 230° C. and at a mold temperature of 50° C., to prepare a test piece of JIS form, conditioning this test piece in a chamber in a humidity of 50% and at a room temperature of 23° C., for 72 hours and measuring the values

TABLE 7

| Polymerization results and physical properties of product | | | |
|---|---|---|---|
| | Example 15 | Comp. ex. 14 | Comp. ex. 15 |
| Solid catalyst component (A) | Present invention | → | → |
| Organoaluminum compound (B) | TEA | → | → |
| Organosilicon compound (C) | DiPDMS* | → | → |
| B/C molar ratio | 2 | 2 | 2 |
| Polymerization step (I) | | | |
| 1st step MFR g/10 min. | 122 | 122 | 123 |
| 2nd step MFR g/10 min. | 99 | 100 | 99 |
| 3rd step MFR g/10 min. | 71 | 70 | 71 |
| log(MFR(h)/MFR(1)) | 0.24 | 0.24 | 0.24 |
| Ratio of polymerized quantities 1st step:2nd step:3rd step | 35:33:32 | 35:33:32 | 35:33:32 |
| MFR(i) g/10 min. | 96 | 96 | 96 |
| Isotactic pentad fraction (P) | 0.975 | 0.975 | 0.975 |
| Mw/Mn | 4.8 | 4.8 | 4.8 |
| Polymerization step (II) MFR(ii): g/10 min. | 0.005 | 0.005 | 0.005 |
| Ratio of polymerized quantities Polymerization (I):polymerization (II) | 88:12 | 88:12 | 88:12 |
| Product powder | | | |
| MFR g/10 min. | 29 | 29 | 29 |
| log(MFR(i)/MFR(ii)) | 4.3 | 4.3 | 4.3 |
| R-E* wt % | 38 | 25 | 85 |
| T-E* wt % | 4.6 | 3 | 10.2 |
| Yield Kg | 51 | 48 | 50 |
| Soluble polymer % | 3.1 | 4.2 | 1.8 |
| Injection-molded product | | | |
| Bending modulus Mpa | 1480 | 1380 | 1550 |
| Tensile strength Mpa | 36 | 34 | 37 |
| Tensile elongation % | >800 | >800 | 30 |
| HDT °C. | 116 | 112 | 117 |
| II* J/m | 96 | 85 | 60 | of physical properties. As a result, the bending modulus was 1,750 MPa, the tensile strength was 38 mPa, the tensile elongation was 380%, the HDT was 127° C. and the Izodt impact was 119 J/m.

EXAMPLE 17

Example 16 was repeated except that to the product powder 3.0 kg of the propylene.ethylene block copolymer composition obtained in Example 2 were added a phenolic heat stabilizer (0.003 Kg), calcium stearate (0.003 Kg), and talc 0.03 kg (bulk density: 0.12 cm²/g and average particular diameter: 1.3 μm), followed by measuring the value of physical properties of the resulting blend.

The values were as follows:

bending modulus: 1,870 MPa, tensile strength: 38 mPa, tensile elongation: 380%, HDI: 131° C., and Izodt impact: 98 J/m Example 16 was repeated except that to the product powder of the propylene.ethylene copolymer composition (3.0 Kg) obtained in Example 2 were added a phenolic heat stabilizer (0.003 Kg), calcium stearate (0.003 Kg), and as a non-crystalline ethylene-α-olefin copolymer, a non-crystalline ethylene.propylene copolymer (0.06 Kg) (propylene content: 26% by weight; and Mooney viscosity [ML1+4(100° C.)]:24), followed by measuring the values of physical properties of the resulting blend. The values were as follows:

bending modulus: 1,430 MPa, tensile strength: 36 MPa, tensile elongation: 490%, HDT: 115° C., and Izodt impact: 121 J/m.

What we claim is:

1. In a process for producing a propylene-ethylene block copolymer characterized in that there is used a catalyst system having combined (A) a solid catalyst component containing Ti, Mg, halogen and a polyvalent carboxylic acid ester, B) an organoaluminum compound and (C) an organosilicon compound expressed by the formula $R^4_x R^5_y Si(OR^6)_z$ wherein $R^4$ and $R^6$ each represents a hydrocarbon radical, $R^5$ represents a hydrocarbon radical or a hydrocarbon radical containing a hetereo atom, and $x+y+z=4$, $0 \leq x \leq 2$, $1 \leq y \leq 3$, $1 \leq z \leq 3$, the molar ratio of the organoaluminum compound (B) to the organosilicon compound (C) being represented by the formula (B)/(C) is equal to 1 to 15, and the following two polymerization steps are carried out:

a first polymerization step (I) directed mainly to propylene polymerization, wherein monomers in a ratio of ethylene/(ethylene+propylene)=0 to 5% by weight are fed in two or more polymerization vessels connected in series, to produce 60 to 95% of the total polymerized quantity, and a second polymerization step (II) containing a relatively large quantity of ethylene, wherein monomers in a ratio of ethylene/(ethylene+propylene)=10 to 100% by weight are fed in one or more polymerization vessels, to produce 5 to 40% by weight of the total polymerized quantity, the improvement wherein the process produces a highly stiff propylene-ethylene block copolymer composition characterized in that the composition is produced so that the maximum value of the melt flow rates (hereinafter referred to as MFR(h)) of the polymers formed in the respective vessels of the polymerization step (I) and the minimum value thereof (hereinafter referred to as MFR (1)), have a relationship of $$0.1 \leq \text{Log}(\text{MFR}(h)/\text{MFR}(1)) \leq 1$$

and the MFR(i) of the polymers formed at the polymerization step (I), directed mainly to propylene and the MFR(ii) of the polymers formed at the polymerization step (II) containing a relatively large quantity of ethylene have a relationship of $$3 \leq \text{Log}(\text{MFR}(i)/\text{MFR}(ii)) \leq 7.$$

* * * * *